United States Patent
Bas et al.

(10) Patent No.: US 7,558,339 B2
(45) Date of Patent: Jul. 7, 2009

(54) ASYNCHRONOUS ZCD DEMODULATOR/DECODER

(75) Inventors: Gilles Bas, Beauvoisin (FR); Nicolas Dehaese, Aubagne (FR); Yann Bachelet, Mimet (FR); Sylvain Bourdel, Ensues la Redonne (FR)

(73) Assignees: STMicroelectronics (Rousset) SAS Zi de Rousset, Rousset (FR); Universite de Provence, Marseille Cedex (FR); Universite Paul Cezanne, Aix En Provence, Cedex (FR)

( * ) Notice: Subject to any disclaimer, the term of this patent is extended or adjusted under 35 U.S.C. 154(b) by 564 days.

(21) Appl. No.: 11/317,885

(22) Filed: Dec. 23, 2005

(65) Prior Publication Data

US 2006/0203940 A1 Sep. 14, 2006

(30) Foreign Application Priority Data

Dec. 23, 2004 (FR) .................................. 04 13868

(51) Int. Cl.
*H04L 27/00* (2006.01)
(52) U.S. Cl. ...................... 375/324; 375/334; 375/340; 375/351
(58) Field of Classification Search ................. 375/324, 375/334, 340, 351
See application file for complete search history.

(56) References Cited

U.S. PATENT DOCUMENTS 5,469,112 A 11/1995 Lee
5,633,895 A 5/1997 Powell, II et al.
6,011,816 A * 1/2000 Sanielevici et al. ......... 375/324

OTHER PUBLICATIONS

Detection of Bluetooth signal at zero frequency: a new systematic solution Samadian, S.; Hayashi, R.; Abidi, A.A.; System Theory, 2003. Proceedings of the 35th Southeastern Symposium on Mar. 16-18, 2003 pp. 21-23.*

Kwon, H., et al., "A Novel Digital FM Receiver for Mobile and Personal Communications," IEEE Transactions on Communications, vol. 44, No. 11, Nov. 1996, pp. 1466-1476, XP-002334071.

Preliminary Search Report dated Aug. 10, 2005 for French Application No. 0413868.

* cited by examiner

*Primary Examiner*—Ted Wang
(74) *Attorney, Agent, or Firm*—Lisa Jorgenson; Stephen Bongini; Fleit Gibbons Gutman Bongini & Bianco P.L.

(57) ABSTRACT

There is provided a detector for extracting binary data frequency-modulated on a carrier signal. An axes generator produces M pairs of logic signals, the logic signals of the same pair being in quadrature. The decoder includes M asynchronous logic zero-crossing detectors producing first pulses and second pulses. An up-counter/down-counter has first, second and third values, and when it has the second value, passing to the first value during a first pulse, and passing to the third value during a second pulse, and a binary decoder generates binary data whose state is not modified when the up-counter/down-counter passes from the first value to the second value or from the third value to the second value. No external time base is required and the decoder has a reduced bit error ratio.

20 Claims, 6 Drawing Sheets

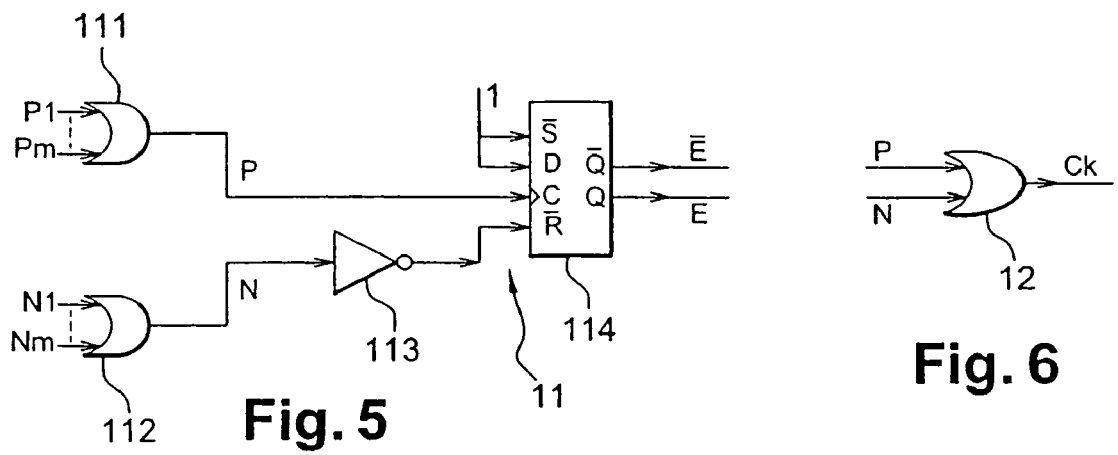
Fig. 5
Fig. 6
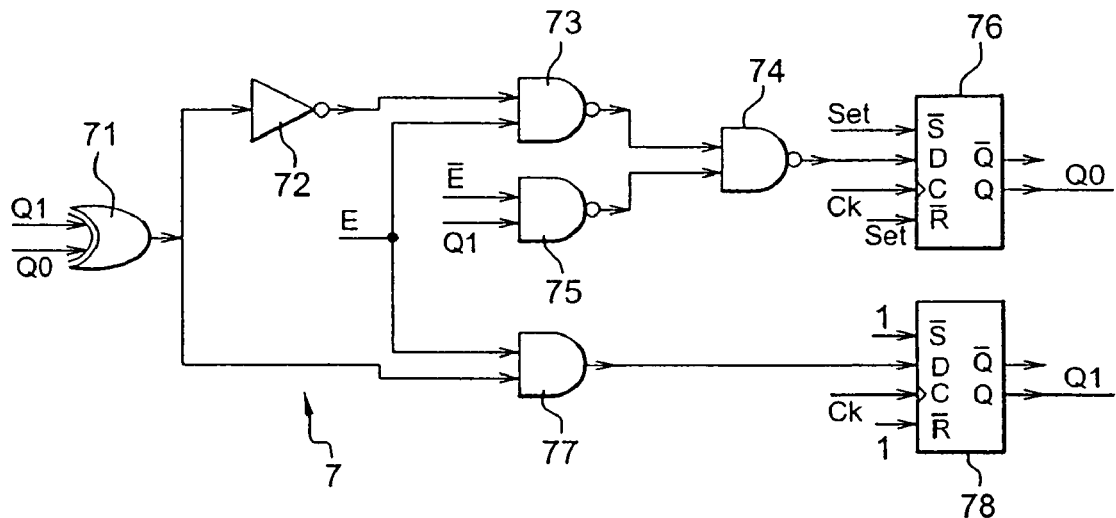
Fig. 7
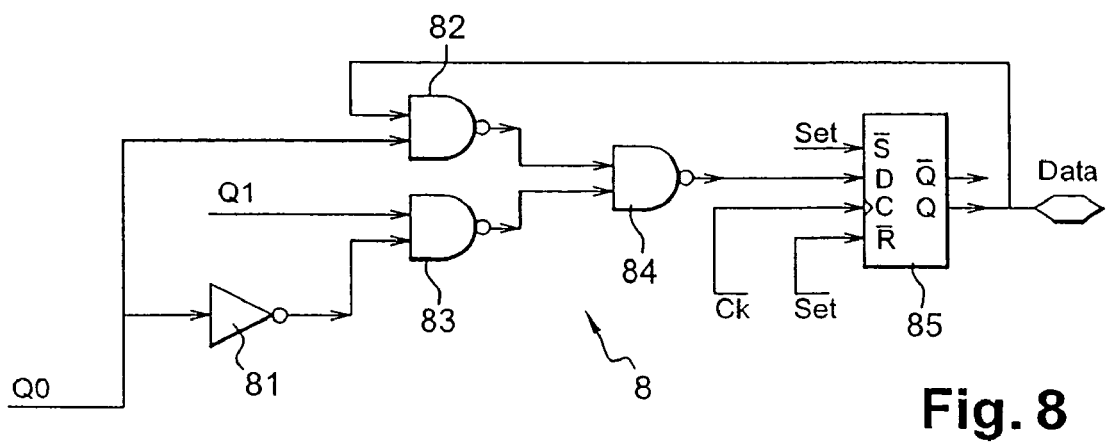
Fig. 8

ASYNCHRONOUS ZCD DEMODULATOR/DECODER

FIELD OF THE INVENTION

This invention relates to a decoder having a demodulator known as a ZCD (Zero-Crossing Demodulator) for demodulating modulated signals commonly referred to as FSK (Frequency-Shift Keying) signals that contain binary data frequency-modulated over a high or very high frequency carrier. In one example, the carrier has a frequency of 2.45 GHz, frequency-modulated by the signal containing the 2. MHz frequency data.. Such demodulators are used, in particular, for inexpensive applications such as microcomputers, home automation, industrial, banking, and security applications, etc.

BACKGROUND OF THE INVENTION

From a theoretical viewpoint, an FSK-type signal S(t) received by the antenna of a detection circuit can be shown, on two axes I0, Q0 in quadrature, by a rotating vector having an abscissa IL0(t) and an ordinate QL0(t) (see FIG. 1). The direction of rotation of the vector corresponds to the binary data contained in the signals IL0 (t), QL0 (t). Thus, when the direction of rotation of the vector is positive (clockwise direction of rotation), the binary data represented by the vector is a logical "1"; conversely, when the direction of rotation of the vector is negative, then the binary data is a logical "0". On the other hand, the speed of rotation of the vector corresponds to the value of the frequency departure of the modulated signal in relation to the carrier signal and is therefore dependent on the modulation frequency of the carrier (in the example, the frequency departure is +2 MHz when a logical "1" is transmitted and −2 MHz when a logical "0" is transmitted). The relationship between the frequency departure and the data transmission frequency is called the modulation index, this index corresponds to the number of revolutions completed by the rotating vector as one bit of data is transmitted. For example, if the modulation frequency of the carrier is 2 MHz and the data transmission frequency is 1 MHz, then, as one bit of data is transmitted, the vector completes two revolutions (modulation index =2) and thereby intersects the axes IL0 or QL0 an average of 8 times. On this subject, see, in particular, document D1: "A Novel Digital FM Receiver for Mobile and Personal Communications," IEEE Transactions on Communications, Vol. 44, No. 11, Nov. 1996, pp. 1466-1476.

The direction of rotation of the vector at a given moment t is dependent, in particular, on the mathematical derivatives of the signals IL0(t), QL0(t) at the moment t in question. A simple way of determining the direction of rotation of the rotating vector is to observe the derivative of QL0(t) at the moment when IL0(t) passes through +/−1 (i.e., when the rotating vector intersects the axis I0), or conversely, to observe the derivative of IL0(t) at the moment when QL0(t) passes through +/−1 (i.e., when the rotating vector intersects the axis Q0). In other words, on the one hand, the zero crossing of one of the signals IL0(t), QL0(t) is determined (when the other signal is equal to +/−1) and, on the other hand, the zero crossing order of the signals IL0(t), QL0(t).

In order to obtain more accurate results, several pairs of supplementary axes (I1, Q1), (I2, Q2), ..., (IM, QM) are used (see FIG. 1). Each pair of supplementary axes is derived from the initial pair of axes (I0, Q0) by an increasing or decreasing phase shift with respect to M, ranging, for example, between 0 and Π/2; in this case, and in a similar way in the case where a single pair of axes is used, the ZCD demodulator scans the rotating vector, determines the moment when the vector intersects one of the axes I0, I1, ..., IM, Q1, Q2, ..., QM, determines the crossing order of the various axes and deduces therefrom the value of the transmitted data.

FIG. 2 shows a block diagram of an FSK signal detection circuit comprising an antenna 10, an axes generator 20 and a ZCD demodulator. The detection circuit receives the modulated signal S(t) on the antenna 10 and extracts from it the binary data DATA that it contains.

The axes generator 20 produces two signals IL0(t), QL0(t) from the modulated signal S(t) that it receives on the antenna 10. To accomplish this, the axis generator filters the signal S(t) and amplifies it through the filter 22 and the amplifier 24. In parallel, a generator 32 of the PLL type (Phase Lock Loop) produces a reference frequency signal equal to the carrier frequency of the modulated signal S(t) received on the antenna (in a 2.45 GHz example); the reference signal is phase-shifted by Π/2 in a phase shifter 34. In a first branch, the amplified signal SA(t) (with a frequency of 2.45 GHz +/−2 MHz) is multiplied by the reference signal (multiplier 42); the multiplication result is filtered by the filter 44 to delete the 2*2.45 GHZ +/−2 MHz frequency component and to retain only the 2 MHz frequency component corresponding to the binary data. This latter component is then clipped (i.e., limited in amplitude by a clipper 46) in order to produce a signal IL0(t) having an amplitude ranging between 0 and 1. In a second branch, the amplified signal SA(t) (having a frequency of 2.45 GHz +/−2 MHz) is multiplied (multiplier 52) by the reference signal phase-shifted by Π/2, filtered by a filter 54 (deletion of the component of the 2*2.45 GHZ +/−2 MHz frequency signal), then clipped (clipper 56) in order to produce a signal QL0(t) having an amplitude ranging between 0 and 1. For all practical purposes, the signal QL0(t) is the signal IL0(t) produced by the first branch, phase-shifted by Π/2 The signals IL0(t), QL0(t) contain only the 2 MHz frequency binary data initially contained in the modulated signal S(t), the carrier signal having been eliminated by the filters 44, 54.

The axes generator also produces M pairs of supplementary signals (IL1(t), QL1(t), ..., (ILM(t), QLM(t)) and converts them into corresponding binary signals (IL1, QL1), ..., (ILM, QLM). Thus, for any i:

ILi=0 if ILi(t)<0

ILi=1 if ILi(t)>0

QLi=0 if QLi(t)<0

QLi=1 if QLi(t)>0

The signals (IL1(t), QL1(t), ..., (ILM(t), QLM(t)), and therefore also the corresponding binary signals (IL1, QL1), ..., (ILM, QLM) are all derived from the signals (IL0(t), QL0(t)) by an increasing or decreasing phase shift with respect to M, M being a fixed integer.

The signals (IL1, QL1), ..., (ILM, QLM) are next supplied to a ZCD demodulator 60 that will extract from them the binary data DATA that they contain. In order to accomplish this, the ZCD demodulator includes a set of zero-crossing detectors DPZO1, DPZO2, ..., DPZOM.

According to a known structure, the ZCD demodulator is of the synchronous type.

Each DPZOi detector of digit position i falling between 1 and M receives a pair of signals (ILi, QLi) of the same digit position and produces a pulse DEi at each rising edge of an external clock CLK such that:

DEi=1 if
   ILi=1 when QLi passes from 0 to 1, or
   QLi=1 when ILi passes from 1 to 0
DEi=0 if
   ILi=1 when QLi passes from 1 to 0, or
   QLi=1 when ILi passes from 0 to 1

The pulses DE1, DE2, . . . , DEM are used to increment or decrement a digital counter that is synchronized by the clock signal CLK. At each rising edge of the clock signal CLK:
- if one of the pulses DEi=1, the counter is incremented,
- if one of the pulses DEi=0, the counter is decremented.

Then, at each pulse of an RST signal, the counter produces a piece of binary data that is:
- D=1 if the value of the counter is positive,
- D=0 if the value of the counter is negative, then the counter is reset to zero.

The counter thus serves as an integrator which integrates the signal resulting from the sum of the pulses DE1, DE2, . . . , DEM over a time period equal to the period of the RST signal.

This structure requires that there be a clock signal generator, in addition to the ZCD decoder, and preferably a good quality generator.

The applicant has proposed a solution to these disadvantages in the application FR-04 10324, unpublished as of the date of filing of this application. This document describes an asynchronous ZCD demodulator. This demodulator, shown in FIG. 3, includes a decoder that produces binary data DATA when it receives a set of pairs of logic signals (IL1, QL1), . . . , (ILM, QLM) and extracts from them the digital data DATA that they contain. Each pair of logic signals (ILi, QLi) corresponds to the binary value of the pair of signals (ILi(t), QLi(t)). The ZCD decoder includes a set of zero-crossing detectors DPZ1, DPZ2, . . ., DPZM, and an asynchronous envelope detector 150.

The zero-crossing detectors (DPZ1, . . . , DPZM), are asynchronous logic circuits generating pulses with respect to logic signals (ILi, QLi).

Pulses Pi are generated when:
   ILi=1 when QLi passes from 0 to 1, or
   QLi=1 when ILi passes from 1 to 0
Pulses Ni are generated when:
   ILi=1 when QLi passes from 1 to 0, or
   QLi=1 when ILi passes from 0 to 1

The pulses Ni are applied to a first OR gate to form a signal N. The pulses Pi are applied to a second OR gate to form a signal P. The asynchronous envelope detector produces the binary data DATA after having generated an envelope from the pulses Pi and Ni.

The timing chart of FIG. 4 shows the possible impact of interference on the output signal of the decoder of FIG. 3. The interference may lead to unwanted crossings of the axes by the logic signals ILi and QLi. These unwanted crossings lead to spurious pulses P and N circled in FIG. 4. Thus, some pulses P are replaced by pulses N and vice versa. The binary signal Data coming from the envelope detector is then corrupted in relation to the original binary signal D-E. Determination of the symbol received is then corrupted.

SUMMARY OF THE INVENTION

A need exists for a decoder solving one or more of these disadvantages. Therefore, the object of the invention is a detector for extracting from a modulated signal S(t) binary data frequency-modulated on a carrier signal, the detector comprising an axes generator 20 capable of producing, from the modulated signal S(t), M pairs of logic signals (IL1, QL1), . . . , (ILM, QLM), M being a whole number greater than or equal to 1, the logic signals of the same pair (ILi, QLi) being in quadrature and each pair being phase-shifted with respect to the other pairs by a phase shift dependent on M, and a ZCD demodulator, the ZCD demodulator comprising:
   M zero-crossing detectors DPZ1, . . . , DPZM, each detector being an asynchronous logic circuit capable of producing, in relation to a first logic signal ILi and a second logic signal QLi of a pair of logic signals (ILi, QLi):
   first pulses Ni when:
      the first logic signal ILi is in the first logic state 1 or 0 and the second logic signal QLi passes from the first logic state 1 or 0 to the second logic state 0 or 1, or
      the second logic signal QLi is in the first logic state 1 or 0 and the first logic signal QLi passes from the second logic state 0 or 1 to the first logic state 1 or 0, and:
   second pulses Pi when:
      the first logic signal ILi is in a first logic state 1 or 0 and the second logic signal QLi passes from a second logic state 0 or 1 to the first logic state 1 or 0, or
      the second logic signal QLi is in the first logic state 1 or 0 and the first logic signal QLi passes from the first logic state 0 or 1 to the second logic state 1 or 0, and:
   an up-counter/down-counter:
      having first, second and third values, and
      when it has the second value, passing to the first value during a first pulse, and passing to the third value during a second pulse, and
      a binary decoder generating one of the pieces of binary data at each pulse, the binary data assuming a first state when the up-counter/down-counter has the first value and assuming a second state when the up-counter/down-counter has the third value, the state of the binary data not being modified when the up-counter/down-counter passes from the first value to the second value or from the third value to the second value.

In particular, the invention makes it possible to reduce the bit error ratio. The invention can be implemented using a simple structure and without involving the use of an outside reset signal.

According to one variant, the up-counter/down-counter is maintained at the first value during a first pulse and maintained at the third value during a second pulse.

According to another variant, the up-counter/down-counter has a fourth value that cannot be obtained or maintained during a pulse.

According to another variant, when the up-counter/down-counter has the fourth value, it passes to the second value during a pulse.

According to yet another variant, the detector includes a clock signal formation circuit by combining first and second pulses, comprising an asynchronous envelope detector in order to generate an envelope for the first and second pulses, the up-counter/down-counter detecting a pulse from the clock signal and discriminating a first pulse from a second pulse on the basis of the envelope of the first and second pulses.

According to an variant, M is greater than 1 and the clock formation circuit adds together the first and second pulses P1, . . . , PM, N1, . . . NM.

According to another variant, the envelope detector is a flip-flop type bistable circuit synchronized by the second pulses, set to zero by the first pulses and having a data port to which a reference potential "1" is applied.

According to another variant, the up-counter/down-counter encodes its values on two bits and includes:
   an XOR gate receiving at its input the bits representing the value of the up-counter/down-counter;

an inverter connected to the output of the XOR gate;

an AND gate receiving at its input the envelope and the output of the XOR gate;

a first NAND gate receiving at its input the envelope and the output of the inverter;

a second NAND gate receiving at its input the complement of the envelope and the most significant bit of the up-counter/down-counter;

a third NAND gate receiving at its input the outputs of the first and second NAND gates;

a first flip-flop type bistable circuit synchronized by the clock signal, having a data port to which the output of the third NAND gate is applied.

a second flip-flop type bistable circuit synchronized by the clock signal, having a data port to which the output of the AND gate is applied and having a data port to which a reference potential "1" is applied.

According to yet another variant, the up-counter/down-counter encodes its values on two bits and the binary detector includes:

a fourth NAND gate receiving at its input the most significant bit and the complement of the least significant bit;

a fifth NAND gate receiving at its input the state of the binary data and the least significant bit;

a sixth NAND gate receiving at its input the outputs of the fourth and fifth NAND gates;

a flip-flop type bistable circuit synchronized by the clock signal, having a data port to which the output of the sixth NAND gate is applied and whose output defines the state of the binary data.

According to an variant, each asynchronous zero-crossing detector logic circuit includes a set of logic gates including AND gates, OR gates, logic inverters and/or delay elements assembled so as to produce the first and second pulses.

BRIEF DESCRIPTION OF THE DRAWINGS

The invention will be better understood and other characteristics and advantages will become apparent upon reading the following description of an exemplary implementation of a ZCD decoder according to the invention. The description is to be read in relation to the appended drawings in which:

FIG. 5 is an example of an envelope detector that can be used in a decoder according to the invention, FIG. 6 is an example of an internal clock that can be used in a decoder according to the invention, FIG. 7 shows an example of an up-counter/down-counter that can be used in a decoder according to the invention, FIG. 8 shows an example of a binary data decoder associated with the up-counter/down-counter of FIG. 7.

DETAILED DESCRIPTION OF PREFERRED EMBODIMENTS

The invention proposes to apply the first and second pulses coming from the zero-crossing detectors to an up-counter/down-counter. This up-counter/down-counter has at least three values and the following logic:

when the counter has the second value, passing to the first value during a first pulse and passing to the third value during a second pulse.

The decoder also has a binary decoder generating one of the pieces of binary data at each pulse, the binary data assuming a first state when the counter has the first value and assuming a second state when the counter has the third value, the state of the binary data not being modified when the counter passes from the first value to the second value or from the third value to the second value.

Two successive pulses of the same type are thus necessary in order for the state of the binary data to be modified. The second value thus forms an intermediate value preventing an erroneous change in the binary output data.

Figure 11:
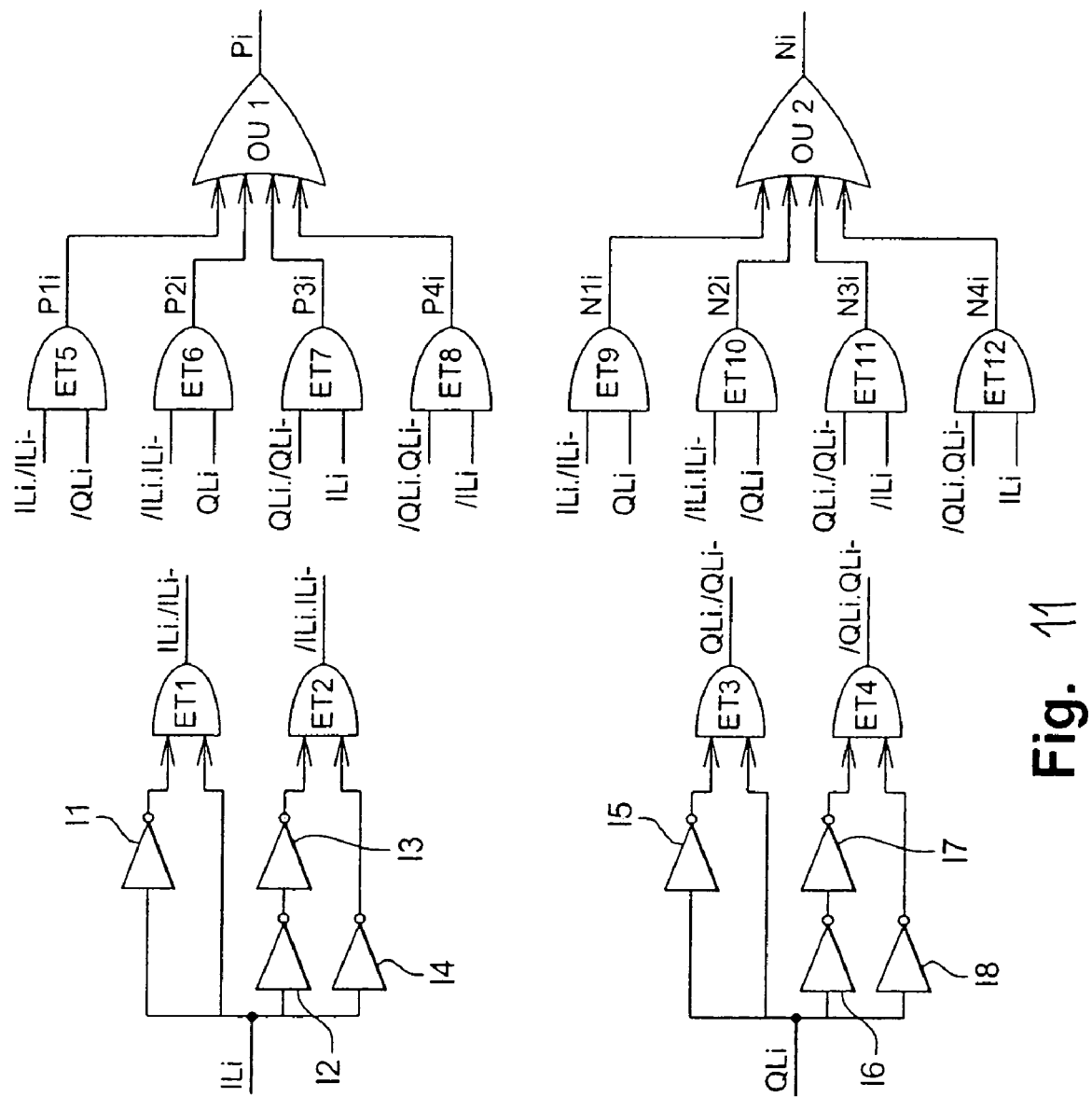
FIG. 11 shows an example of an asynchronous zero-crossing detector.

The detector according to the invention includes zero-crossing detectors such as those shown in FIG. 11. The zero-crossing detectors DPZ1, DPZ2, . . . , DPZM are all similar; for all practical purposes, the latter are state machines that consist of a set of logic gates and that function in a completely asynchronous manner, i.e., without any synchronization signal such as a clock signal.

For i=1 to M, each detector DPZi receives a pair of signals (Ili, QLi) and produces two pulsed signals Pi and Ni.

The notation "/" is used to speak of an inverted (or complementary) logic signal and the notation "-" is used to indicate a time-delayed signal. A delay can be obtained simply by the time it takes the signal to propagate in an appropriately selected inverter.

The signal Ni comprises positive pulses each time that the rotating vector having an abscissa Ili(t) and an ordinate QLi(t) intersects one of the axes Ii, Qi associated with the signals ILi(t), QLi(t) and when it rotates in the negative direction. Thus, there is a pulse Ni=1 when :

QLi=1 and ILi passes from 0 to 1, or

ILi=1 and QLi passes from 1 to 0, or

QLi=0 and ILi passes from 1 to 0, or

ILi=0 and QLi passes from 0 to 1.

This can be translated by the following equation:

$$Ni=(ILi./ILi^-).QLi+(/QLi.QLi^-).ILi+(/ILi.ILi^-)./QLi+ (QLi./QLi^-)./ILi \quad (2)$$

The signal Pi comprises positive pulses each time that the rotating vector having an abscissa ILi (t) and an ordinate QLi (t) intersects one of the axes Ii, Qi associated with the signals ILi (t), QLi(t) and when it rotates in the positive direction. Thus, there is a pulse Pi=1 when:

ILi=1 and QLi passes from 0 to 1, or

QLi.=1 and ILi passes from 1 to 0, or

ILi=0 and QLi passes from 1 to 0, or

QLi=0 and ILi passes from 0 to 1.

This can be translated by the following equation:

$$Pi=(QLi./QLi^-).ILi+(/ILi.ILi^-).QLi+ (/QLi.QLi^-)./ILi+(ILi./ILi^-)./QLi \quad (1)$$

It may be noted that, whatever the value of i ranging between 1 and M:

there can be pulses Pi only when the vector rotates in the negative direction, i.e., when the piece of binary data is equal to 0, there can be Pi pulses only when the vector rotates in the positive direction, i.e., when the piece of binary data is equal to 1.

The detector DPZi shown in FIG. 11 consists of:
- a set of inverters I1 to I8 which, depending on the case, are appropriately selected in order to invert and/or delay the signals ILi and QLi that the detector receives,
- a set of logic gates AND1 to AND12, OR1, OR2, of the AND or OR type, in order to combine the inverted and/or delayed signals.

For the sake of clarity, the outputs of the gates AND1 to AND4 are not connected to the inputs of gates AND5 to AND12, only the signals present at the output of the gates AND1 to AND4 and applied to the input of the gates AND5 to AND12 are indicated in FIG. 11.

The inverter I1 introduces a delay and inverts the signal ILi, in order to produce the signal /ILi$^-$.

The inverters I2, I3, connected in series, simply introduce a delay in the signal ILi, a delay approximately twice as long as the delay introduced by the inverter I1. The inverter I4 simply inverts the signal ILi, without delaying it. The inverters I5, I6, I7, I8 have a function similar to the function of the inverters I1, I2, I3, I4 respectively, but applied to the signal QLi.

The gate AND1 combines the output of the inverter I1 with the signal ILi in order to produce the signal ILi./ILi$^-$, the gate AND2 combines the output of the inverter I3 with the output of the inverter I4 in order to produce the signal /ILi.ILi$^-$, the gate AND3 combines the output of inverter I5 with the signal QLi in order to produce the signal QLi./QLi$^-$ and the gate AND4 combines the output of inverter I7 with the output of inverter I8 in order to produce the signal /QLi.QLi$^-$.

The gate AND9 combines the output of the gate AND1 and the signal QLi in order to produce the signal N1i, the gate AND10 combines the output of the gate AND2 with the output of the inverter I8 in order to produce the signal N2i, the gate AND11 combines the output of the gate AND3 with the output of the inverter I4 in order to produce the signal P3i and the gate AND12 combines the output of the gate AND4 with the signal ILi in order to produce the signal N4i. Finally, the gate OR2 combines the signals N1i, N2i, N3i, N4i in order to produce the output signal Ni.

In a similar way, the gate AND5 combines the output of the gate AND1 and the output of the inverter I8 in order to produce the signal P1i, the gate AND6 combines the output of the gate AND2 with the signal QLi in order to produce the signal P2i, the gate AND7 combines the output of the gate AND3 with the signal ILi in order to produce the signal P3i and the gate AND8 combines the output of the gate AND4 with the output of the inverter I4 in order to produce the signal P4i. Finally, the gate OR1 combines the signals P1i, P2i, P3i, P4i in order to produce the output signal Pi.

In the examples shown below, the first and second states of the binary data are 0 and 1, respectively, and the first and second pulses are of the Ni and Pi type, respectively.

The up-counter/down-counter requires at least three values. However, in the majority of practical embodiments, this up-counter/down-counter will have four values. The fourth value corresponds advantageously to a random state of the up-counter/down-counter that can be obtained only when the decoder is initialized. The logic of the up-counter/down-counter is configured to assume only one of the first, second or third values after a pulse. An outside reset control for the up-counter/down-counter is therefore not indispensable when the decoder according to the invention is powered-up.

The up-counter/down-counter thus has the following truth table:

| Counter Value | Q1 | Q0 | P | N | Following Value | Q1+ | Q0+ |
|---|---|---|---|---|---|---|---|
| 1 | 0 | 0 | ↑ |   | 2 | 0 | 1 |
| 2 | 0 | 1 | ↑ |   | 3 | 1 | 0 |
| 3 | 1 | 0 | ↑ |   | 3 | 1 | 0 |
| 4 | 1 | 1 | ↑ |   | 2 | 0 | 1 |
| 1 | 0 | 0 |   | ↑ | 1 | 0 | 0 |
| 2 | 0 | 1 |   | ↑ | 1 | 0 | 0 |
| 3 | 1 | 0 |   | ↑ | 2 | 0 | 1 |
| 4 | 1 | 1 |   | ↑ | 2 | 0 | 1 |

The up-counter/down-counter thus forms a saturation integrator filter whose values range between 1 and 3 during operation. The value of such a saturation integrator filter can be obtained using the following formula:

$$V_e = Sat\left(V_{e-1} + \sum_{m=1}^{M} D_{e,m}\right).$$

The function y=Sat(x) being defined as follows: y=3 for x>3, y=1 for x<1 and y=x for the other values of x.

FIGS. 5 to 8 show an embodiment of the invention based on flip-flop type bistable circuits. In particular, this embodiment creates and uses envelope and clock signals. The structure of this embodiment is particularly simple and gives the decoder independence with respect to outside controls.

FIG. 5 shows an example of an envelope detector 11. The envelope detector 11 includes an OR gate 112 receiving at its input the first pulses N1 to NM and generating at its output the signal N. The envelope detector 11 includes an OR gate 111 receiving at its input the second pulses P1 to PM and generating the signal P at its output. The detector 11 also includes a flip-flop type bistable circuit 114 synchronized by the second pulses.

The signal N and the signal P are applied, respectively, to the zero-reset input and to the clock input of the bistable circuit 114, a logical "1" being applied to the data port D of the bistable circuit 114. According to the truth table of the bistable circuit 114, at each rising edge of the signal P, the data port D of the bistable circuit is recopied to its data output Q, and at each rising edge of the signal N, the output Q is positioned at 0 until the next rising edge of the signal P. The envelope signals E and /E are thereby generated respectively at the data outputs Q and /Q of the bistable circuit 114.

In this way, the signal P acts as a clock signal and the signal N acts as a zero-reset signal for the bistable circuit 114 whose data port is maintained at "1". The envelope detector 11 thus uses clock signals and zero-reset signals that are synchronous with the data to be detected; this makes it possible to obtain optimal accuracy without resorting to an external clock.

FIG. 6 shows the generation of an internal clock signal from the pulses N and P. The pulses N and P are applied to the input of an OR gate 12. The OR gate 12 thereby generates a pulse Ck to each pulse N or P.

FIG. 7 shows an example of an up-counter/down-counter 7 structure with four values defined by the combinations of the bits $Q_1$ and $Q_0$. The first value is associated with the combination (0,0), the second value is associated with the combination (0,1), the third value is associated with the combination (1,0) and a fourth value is associated with the combination (1,1).

The bits $Q_0$ and $Q_1$ are applied to the input of an XOR gate 71. The output of the gate 71 is connected to the input of the inverter 72 and to an input of the AND gate 77. The output of the inverter 72 is connected to an input of the NAND gate 73.

The envelope signal E is applied to another input of the gate 73 and to another input of the gate 77. The envelope signal /E and the bit $Q_1$ are applied to the input of the NAND gate 75. The outputs of the gates 73 and 75 are applied to the inputs of a NAND gate 74.

The output of the gate 74 is applied to the input D of a bistable circuit 76. The signal Ck is applied to the clock input and the signal Set is applied to the inputs R and S of this bistable circuit. The bistable circuit supplies the bit Qo at its output.

The output of the gate 77 is applied to the input D of the bistable circuit 78. The signal Ck is applied to the clock input and a logic level "1" signal is applied to the inputs R and S of this bistable circuit. The bistable circuit supplies the bit $Q_1$ at its output.

The circuit of FIG. 7 thus verifies the following logic equations:

$$Q_0^+ = E \cdot /(Q_1 \oplus Q_0) + /E \cdot Q_1$$

$$Q_1^+ = E \cdot (Q_1 \oplus Q_0)$$

The following truth table for the up-counter/down-counter is then as follows:

| Counter Value | Q1 | Q0 | Ck | E | Following Value | Q1+ | Q0+ |
|---|---|---|---|---|---|---|---|
| 1 | 0 | 0 | ↑ | 1 | 2 | 0 | 1 |
| 2 | 0 | 1 | ↑ | 1 | 3 | 1 | 0 |
| 3 | 1 | 0 | ↑ | 1 | 3 | 1 | 0 |
| 4 | 1 | 1 | ↑ | 1 | 2 | 0 | 1 |
| 1 | 0 | 0 | ↑ | 0 | 1 | 0 | 0 |
| 2 | 0 | 1 | ↑ | 0 | 1 | 0 | 0 |
| 3 | 1 | 0 | ↑ | 0 | 2 | 0 | 1 |
| 4 | 1 | 1 | ↑ | 0 | 2 | 0 | 1 |

It is noted that the fourth value can be obtained only when the circuit is initialized: whatever the value of the up-counter/down-counter 7, whatever the value of the signal E, a pulse Ck cannot modify the value of the up-counter/down-counter 7 towards the fourth value. The up-counter/down-counter 7 therefore does not require outside resetting. The functional independence of the detector with respect to the outside is thus further improved.

FIG. 8 shows an example of a binary decoder 8 associated with the up-counter/down-counter 7 of FIG. 7.

The bit $Q_0$ is applied to the input of an inverter 81 and to an input of the NAND gate 82. The binary signal Data is applied to another input of the gate 82. The output of the inverter 81 and the bit $Q_1$ are applied to the input of the NAND gate 83. The outputs of the gates 82 and 83 are applied to the respective inputs of a NAND gate 84. The output of the gate 84 is applied to the input D of the bistable circuit 85. The signal Ck is applied to the clock input of this bistable circuit 85. The signal Set is applied to the inputs R and S of this bistable circuit 85. The bistable circuit supplies the desired binary data at its output Q.

The binary decoder 8 thus has the following truth table:

| Counter Value | $Q_1$ | $Q_0$ | Ck | D | D+ |
|---|---|---|---|---|---|
| 1 | 0 | 0 | ↑ | 0 | 0 |
| 2 | 0 | 1 | ↑ | 0 | 0 |
| 3 | 1 | 0 | ↑ | 0 | 1 |
| 4 | 1 | 1 | ↑ | 0 | 0 |
| 1 | 0 | 0 | ↑ | 1 | 0 |
| 2 | 0 | 1 | ↑ | 1 | 1 |
| 3 | 1 | 0 | ↑ | 1 | 1 |
| 4 | 1 | 1 | ↑ | 1 | 1 |

This table corresponds to the following equation:

$$D_+ = Q_1 \cdot /Q_0 + D \cdot Q_0$$

Figure 9:
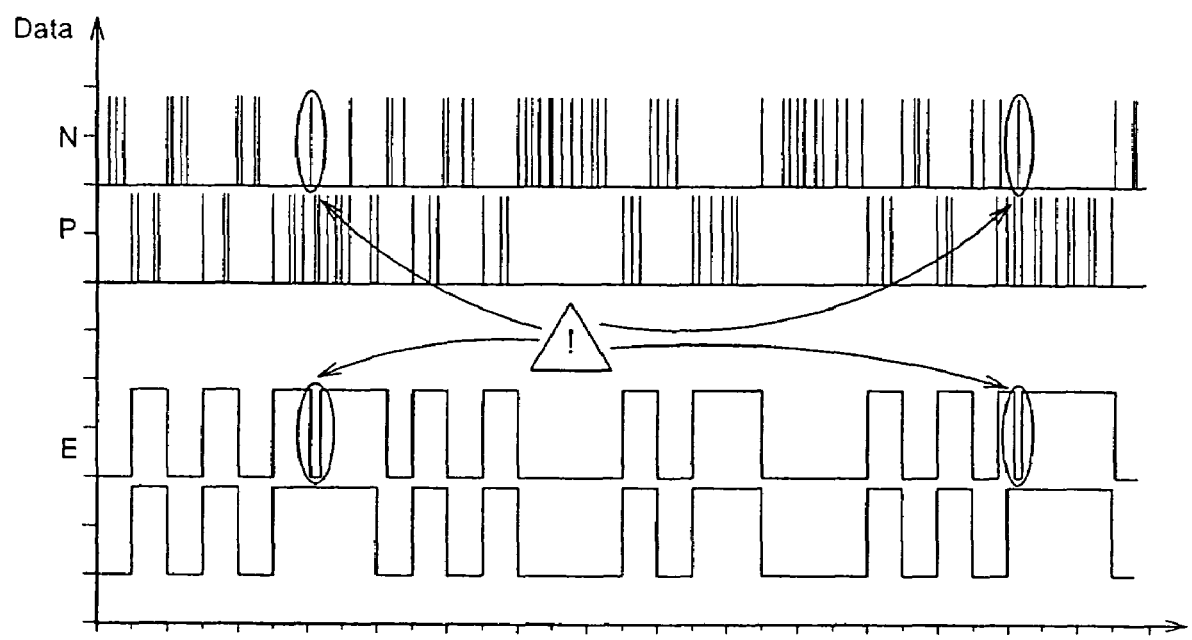
FIG. 9 is a timing chart showing the binary output data in the presence of interference.

FIG. 9 shows an operational timing chart for the decoder of the invention when there are errors with pulses N and P. The erroneous pulses N are circled. Their impact on the envelope signal is shown. However, it is noted that the binary output data Data is consistent with the original binary signal. The erroneous pulses N thus had no impact on the signal Data.

Figure 1:
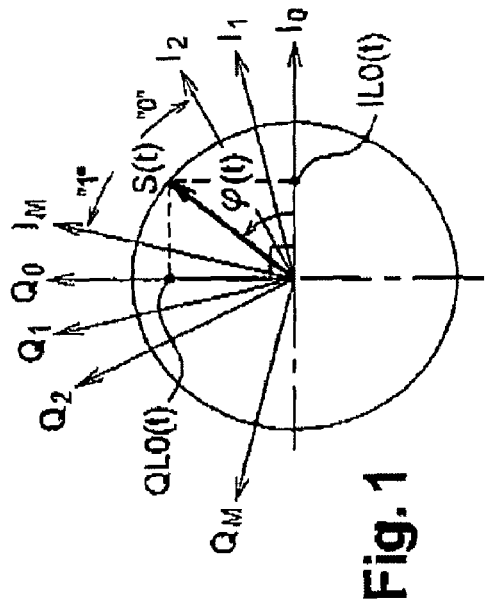
FIG. 1, which has already been described, is an illustration of a modulated signal S(t) to be decoded, in a system of appropriate axes.
Figure 2:
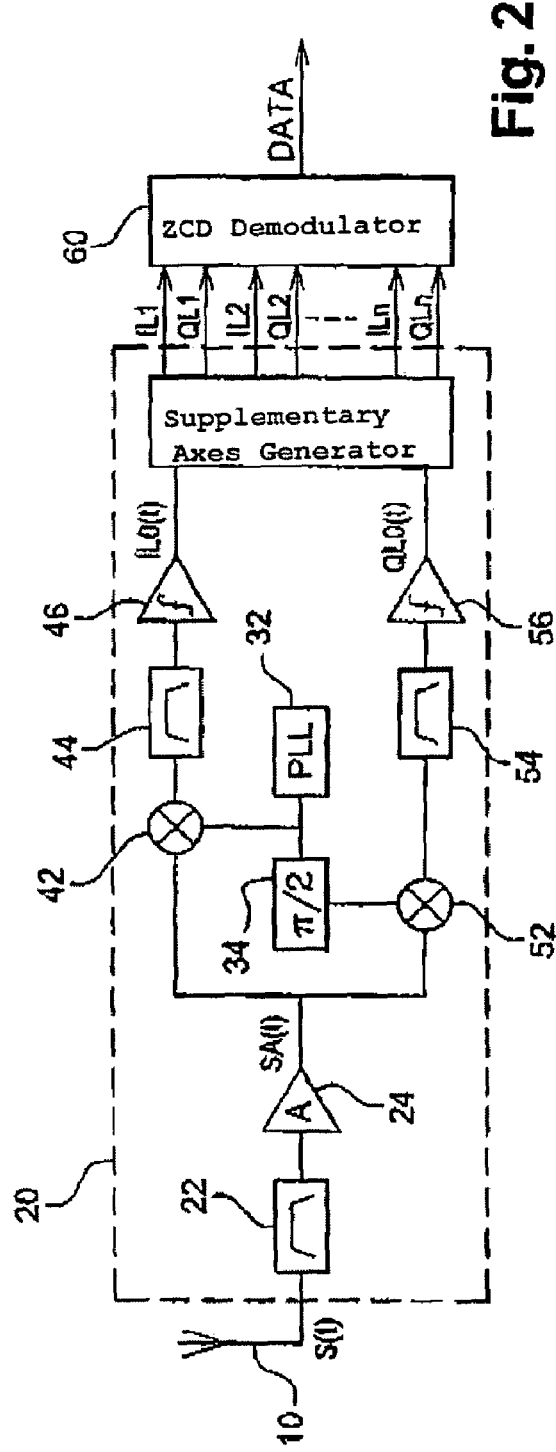
FIG. 2, which has already been described, is a block diagram of a detection circuit using a known ZCD decoder.
Figure 3:
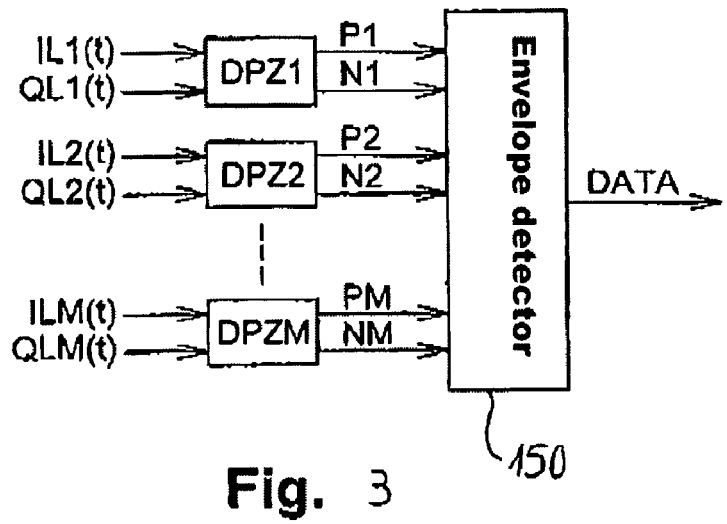
FIG. 3 is a block diagram of a ZCD demodulator described in an unpublished prior application.
Figure 4:
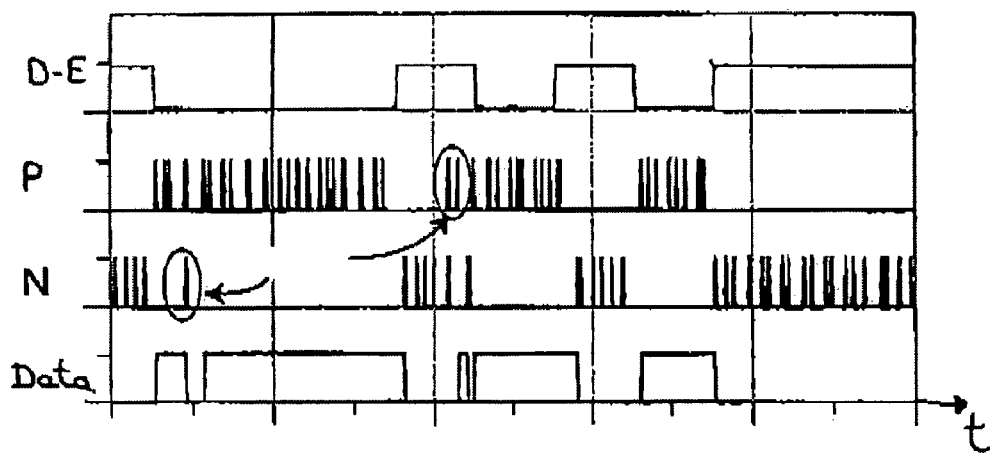
FIG. 4 is a timing chart showing possible detection errors of the demodulator of FIG. 3 in a noisy environment.
Figure 10:
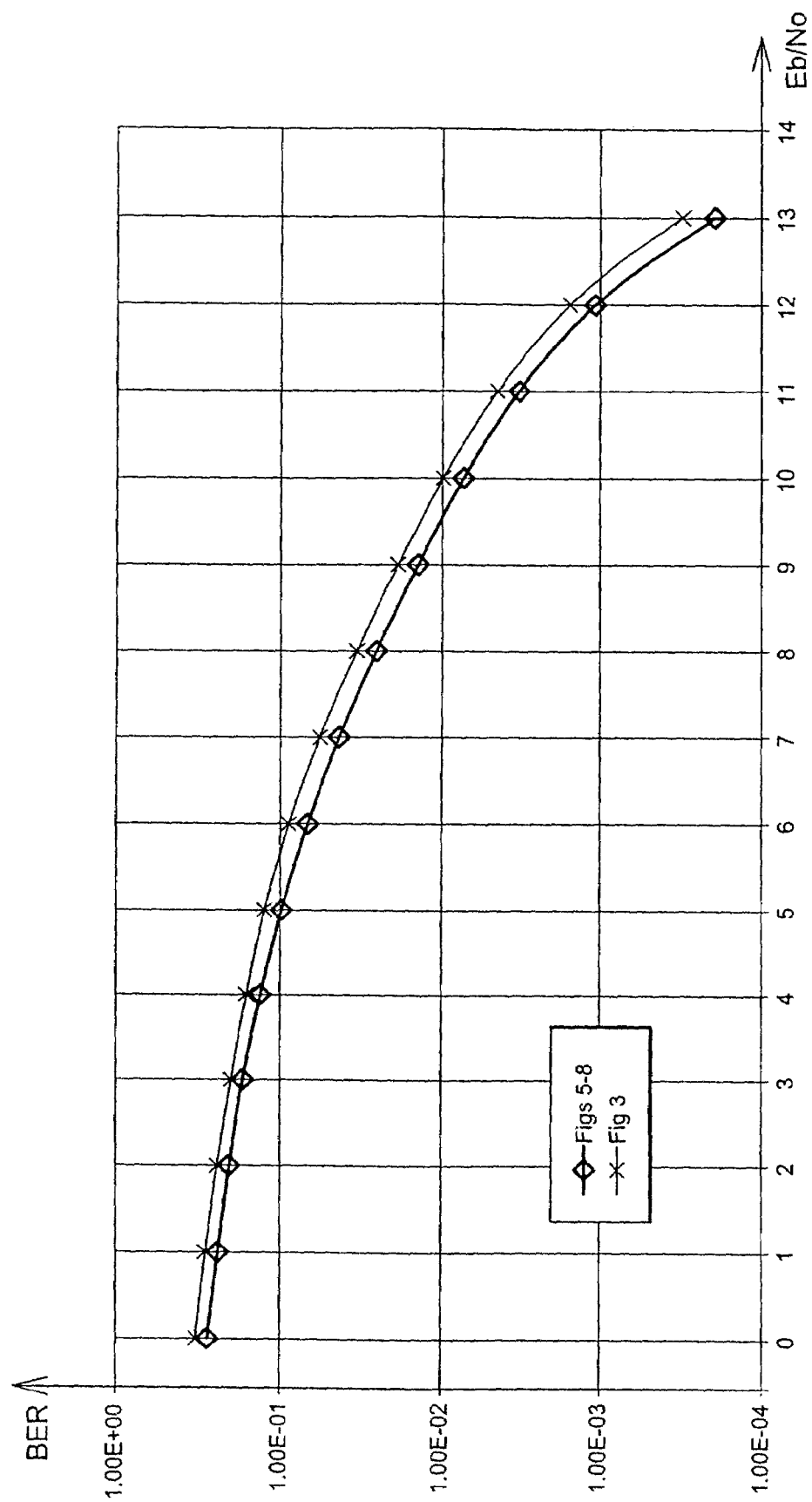
FIG. 10 is a graph showing the respective bit error ratios of the demodulators of FIG. 3 and FIGS. 5 to 8.

FIG. 10 shows the respective bit error ratios for the demodulator of FIG. 3 and for the demodulator of FIGS. 5 to 8, with respect to the signal-to-noise ratio. It is noted that the detector according to the invention has a lower error ratio over the entire range tested. The detector according to the invention can thus be used with a reduced modulation index, e.g., 1 or 2. The bandwidth of the reception circuit including the detector can thereby be increased.

Although the example shown corresponds to the presence of several pairs of axes, the invention likewise applies, of course, to the case of a single pair of axes.

What is claimed is:

1. A detector for extracting from a modulated signal binary data frequency-modulated on a carrier signal, the detector comprising:
   an axes generator capable of producing, from the modulated signal, M pairs of logic signals, M being a whole number greater than or equal to 1, the logic signals of the same pair being in quadrature and each pair being phase-shifted with respect to the other pairs by a phase shift dependent on M; and
   a Zero-Crossing Demodulator (ZCD) including:
      M zero-crossing detectors, each detector being an asynchronous logic circuit capable of producing, in relation to a first logic signal and a second logic signal of a pair of logic signals, first pulses when:
         the first logic signal is in the first logic state and the second logic signal passes from the first logic state to the second logic state, or
         the second logic signal is in the first logic state and the first logic signal passes from the second logic state to the first logic state,
      and capable of producing second pulses when:
         the first logic signal is in a first logic state and the second logic signal passes from a second logic state to the first logic state, or
         the second logic signal is in the first logic state and the first logic signal passes from the first logic state to the second logic state;
      an up-counter/down-counter having first, second and third values, the up-counter/down-counter, when it has the second value, passing to the first value in response to a first pulse, and passing to the third value in response to a second pulse; and
      a binary decoder generating one piece of binary data at each pulse, the binary data assuming a first state when the up-counter/down-counter has the first value and assuming a second state when the up-counter/down-counter has the third value, the state of the binary data not being modified when the up-counter/down-counter passes from the first value to the second value or from the third value to the second value.

2. The detector as claimed in claim 1, wherein the up-counter/down-counter is maintained at the first value in response to a first pulse, and is maintained at the third value in response to a second pulse.

3. The detector as claimed in claim 1, wherein the up-counter/down-counter has a fourth value that cannot be obtained in response to any pulse.

4. The detector as claimed in claim 3, wherein, when the up-counter/down-counter has the fourth value, the up-counter/down-counter passes to the second value in response to any pulse.

5. The detector as claimed claim 1, further comprising:
a clock signal formation circuit forming a clock signal by combining first and second pulses; and
an asynchronous envelope detector generating an envelope for the first and second pulses, the up-counter/down-counter detecting a pulse from the clock signal and discriminating a first pulse from a second pulse on the basis of the envelope.

6. The detector as claimed in claim 5,
wherein M is greater than 1, and
the clock signal formation circuit adds together the first and second pulses.

7. The detector as claimed in claim 5, wherein the envelope detector includes a flip-flop type bistable circuit synchronized by the second pulses, set to zero by the first pulses, and having a data port to which a reference potential is applied.

8. The detector as claimed in claim 5, wherein the up-counter/down-counter encodes its values on two bits the up-counter/down-counter including:
an XOR gate receiving the bits representing the value of the up-counter/down-counter;
an inverter connected to the output of the XOR gate;
an AND gate receiving the envelope and the output of the XOR gate;
a first NAND gate receiving the envelope and the output of the inverter;
a second NAND gate receiving the complement of the envelope and the most significant bit of the value of the up-counter/down-counter;
a third NAND gate receiving the outputs of the first and second NAND gates;
a first flip-flop type bistable circuit synchronized by the clock signal, and having a data port to which the output of the third NAND gate is applied; and
a second flip-flop type bistable circuit synchronized by the clock signal, having a data port to which the output of the AND gate is applied, and having an input to which a reference potential is applied.

9. The detector as claimed in claim 5,
wherein the up-counter/down-counter encodes its values on two bits, the binary decoder includes:
a fourth NAND gate receiving the most significant bit of the value of the up-counter/down-counter and the complement of the least significant bit of the value of the up-counter/down-counter;
a fifth NAND gate receiving at the state of the binary data and the least significant bit of the value of the up-counter/down-counter;
a sixth NAND gate receiving the outputs of the fourth and fifth NAND gates; and
a flip-flop type bistable circuit synchronized by the clock signal, having a data port to which the output of the sixth NAND gate is applied, and whose output defines the state of the binary data.

10. The detector as claimed in claim 1, wherein each zero-crossing detector includes a set of logic gates, including AND gates, OR gates, and at least one of logic inverters and delay elements, assembled so as to produce the first and second pulses.

11. A Zero Crossing Demodulator (ZCD) for a signal detection circuit that extracts binary data frequency-modulated on a carrier signal, the ZCD demodulator comprising:
M zero-crossing detectors, each detector being an asynchronous logic circuit producing first and second pulses in relation to a first logic signal and a second logic signal of a pair of logic signals;
an up-counter/down-counter having first, second and third values; and
a binary decoder generating binary data at each pulse, the binary data assuming a first state when the up-counter/down-counter has the first value and assuming a second state when the up-counter/down-counter has the third value,
wherein each of the detectors produces one of the first pulses when:
the first logic signal is in the first logic state and the second logic signal passes from the-first logic state to the second logic state, or
the second logic signal is in the first logic state and the first logic signal passes from the second logic state to the first logic state,
each of the detectors produces one of the second pulses when:
the first logic signal is in a first logic state and the second logic signal passes from a second logic state to the first logic state, or
the second logic signal is in the first logic state and the first logic signal passes from the first logic state to the second logic state,
when the up-counter/down-counter has the second value, the up-counter/down-counter passes to the first value in response to a first pulse, and passes to the third value in response to a second pulse, and
the state of the binary data is not modified when the up-counter/down-counter passes from the first value to the second value or from the third value to the second value.

12. The ZCD demodulator as claimed in claim 11, wherein the up-counter/down-counter is maintained at the first value in response to a first pulse, and is maintained at the third value in response to a second pulse.

13. The ZCD demodulator as claimed in claim 11, wherein the up-counter/down-counter has a fourth value that cannot be obtained in response to any pulse.

14. The ZCD demodulator as claimed in claim 13, wherein, when the up-counter/down-counter has the fourth value, the up-counter/down-counter passes to the second value in response to any pulse.

15. The ZCD demodulator as claimed claim 11, further comprising:
a clock signal formation circuit forming a clock signal by combining first and second pulses; and
an asynchronous envelope detector generating an envelope for the first and second pulses, the up-counter/down-counter detecting a pulse from the clock signal and discriminating a first pulse from a second pulse on the basis of the envelope.

16. The ZCD demodulator as claimed in claim 15,
wherein M is greater than 1, and
the clock signal formation circuit adds together the first and second pulses.

17. The ZCD demodulator as claimed in claim 15, wherein the envelope detector includes a flip-flop type bistable circuit synchronized by the second pulses, and set to zero by the first pulses.

18. The ZCD demodulator as claimed in claim 15, wherein the up-counter/down-counter encodes its values on two bits, the up-counter/down-counter including:
- an XOR gate receiving bits representing the value of the up-counter/down-counter;
- an inverter connected to the output of the XOR gate;
- an AND gate receiving the envelope and the output of the XOR gate;
- a first NAND gate receiving the envelope and the output of the inverter;
- a second NAND gate receiving the complement of the envelope and the most significant bit of the value of the up-counter/down-counter;
- a third NAND gate receiving the outputs of the first and second NAND gates;
- a first flip-flop type bistable circuit synchronized by the clock signal, and having a data port to which the output of the third NAND gate is applied; and
- a second flip-flop type bistable circuit synchronized by the clock signal, and having a data port to which the output of the AND gate is applied.

19. The ZCD demodulator as claimed in claim 15, wherein the up-counter/down-counter encodes its values on two bits, and the binary decoder includes:
- a fourth NAND gate receiving the most significant bit of the value of the up-counter/down-counter and the complement of the least significant bit of the value of the up-counter/down-counter;
- a fifth NAND gate receiving the state of the binary data and the least significant bit of the value of the up-counter/down-counter;
- a sixth NAND gate receiving the outputs of the fourth and fifth NAND gates; and
- a flip-flop type bistable circuit synchronized by the clock signal, having a data port to which the output of the sixth NAND gate is applied, and whose output defines the state of the binary data.

20. The ZCD demodulator as claimed in claim 11, wherein each zero-crossing detector includes a set of logic gates that produce the first and second pulses.

* * * * *